(12) United States Patent
Oudekerk

(10) Patent No.: US 7,931,227 B1
(45) Date of Patent: Apr. 26, 2011

(54) MULTIFUNCTIONAL ELECTRICAL WORK CADDY

(76) Inventor: Ronald P. Oudekerk, Clarklake, MI (US)

( * ) Notice: Subject to any disclaimer, the term of this patent is extended or adjusted under 35 U.S.C. 154(b) by 0 days.

(21) Appl. No.: 11/983,095

(22) Filed: Nov. 7, 2007

Related U.S. Application Data (60) Provisional application No. 60/857,183, filed on Nov. 7, 2006.

(51) Int. Cl.
   *B65H 16/02* (2006.01)
(52) U.S. Cl. .......... 242/557; 242/403.1; 242/594.3; 242/594.4
(58) Field of Classification Search .......... 242/557, 242/533.8, 403, 403.1, 594.3–594.4, 129
   See application file for complete search history.

(56) References Cited

U.S. PATENT DOCUMENTS

| | | | |
|---|---|---|---|
| 3,831,877 A * | 8/1974 | Bennett et al. ............. | 242/594.3 |
| 3,856,230 A | 12/1974 | Zimmer | |
| 4,391,422 A * | 7/1983 | McDonald ................. | 242/129.6 |
| 4,457,527 A * | 7/1984 | Lowery ....................... | 280/47.19 |
| 4,533,091 A | 8/1985 | Knight et al. | |
| 4,705,283 A * | 11/1987 | Kleisath ...................... | 280/47.12 |
| 5,285,981 A | 2/1994 | Pavelka | |
| 5,308,012 A | 5/1994 | Fuller | |
| 5,316,232 A * | 5/1994 | Lambert, Jr. ............... | 242/422.4 |
| 5,509,671 A | 4/1996 | Campbell | |
| 5,551,773 A * | 9/1996 | Cottrell ...................... | 312/249.8 |
| 5,655,622 A | 8/1997 | Pavlu | |
| 5,687,928 A * | 11/1997 | Lassiter ....................... | 242/557 |
| 5,794,886 A | 8/1998 | Cook | |
| 5,887,819 A | 3/1999 | Korn et al. | |
| 6,182,920 B1 * | 2/2001 | Watkins ...................... | 242/594.4 |
| 6,416,010 B2 * | 7/2002 | Fletcher ...................... | 242/397 |
| 6,685,132 B1 * | 2/2004 | Allen ............................. | 242/557 |
| 6,688,550 B1 | 2/2004 | Mullins | |
| 6,698,682 B1 * | 3/2004 | Roderick ...................... | 242/557 |

* cited by examiner

*Primary Examiner* — Sang Kim
(74) *Attorney, Agent, or Firm* — Robert C. Montgomery (57) ABSTRACT

An apparatus for transporting, storing, and deploying multiple spools or reels of electrical wires or cable using a transportable caddy with functional features to facilitate the process of pulling multiple wires or cables is herein disclosed. The caddy comprises a cart with an attachable set of wheels, a handle, and support legs allowing the caddy to be easily moved and set in place at a work site in a vertical, horizontal, or angled position. When in use, the support legs hold the cart in an angular position during a wire or cable pulling operation. The cart also provides a shield for the wire spools from work site contaminants. Integral to the design are a series of steel rods, spacers, and locking features that allow for the quick interchange of wire or cable spools or reels.

26 Claims, 5 Drawing Sheets

MULTIFUNCTIONAL ELECTRICAL WORK CADDY

RELATED APPLICATIONS

The present invention was first described in and claims the benefit of U.S. Provisional Patent Application No. 60/857,183 filed on Nov. 7, 2006, the entire disclosures of which are incorporated herein by reference.

FIELD OF THE INVENTION

The present invention relates generally to a multiple reel wire caddy apparatus for electricians and, more particularly, to an apparatus incorporate transporting, storing and deploying wire stored on multiple reels or spools.

BACKGROUND OF THE INVENTION

Professional electricians on a job site require many different types and sizes of wire and/or cable. The spools of wire and/or cable are oftentimes, very heavy and difficult to manipulate while running wire through conduits or electrical runs. Accordingly, there is a need for a means by which cable and/or wire can be stored, transported and deployed in a manner without the disadvantages as described above. The development of the invention herein described fulfills this need.

U.S. Pat. No. 6,688,550 issued to Mullins discloses a portable supply rack for spool-dispensed materials. This patent does not appear to disclose an apparatus capable of wheeled mobility, nor does it appear to disclose an apparatus with a telescoping handle or adjustable feet.

U.S. Pat. No. 5,887,819 issued to Korn et al. discloses a wire or tubing spool rack with interchangeable slide members. This patent does not appear to disclose an apparatus that possesses wheeled mobility, has guides for the wire which is dispensed and that operates as a dolly.

U.S. Pat. No. 5,794,886 issued to Cook discloses a rotatably releasable wire reel caddy. This patent does not appear to disclose an apparatus that possesses wheeled mobility, has guides for the wire which is dispensed and that operates as a dolly.

U.S. Pat. No. 5,655,622 issued to Pavlu discloses a wire caddy attachable to a ladder. This patent does not appear to disclose an apparatus that possesses wheeled mobility, has guides for the wire which is dispensed, operates as a dolly and can accommodate a plurality of spools.

U.S. Pat. No. 5,509,671 issued to Campbell a cart for carrying spools of wire. This patent does not appear to disclose an apparatus that possesses wire guides for dispensing wire, a closed cabinet to deter environmental contamination, nor does the patent disclose a cart with a telescoping handle.

U.S. Pat. No. 5,308,012 issued to Fuller discloses a folding wirecart convertible into float and handtruck. This patent does not appear to disclose an apparatus that possesses guides for the wire which is dispensed, nor does it disclose an apparatus that possesses a telescoping handle and maneuverability.

U.S. Pat. No. 5,285,981 issued to Pavelka discloses a wire dispenser. This patent does not appear to disclose an apparatus that possesses wire guides for dispensing wire, a closed cabinet to deter environmental contamination, nor does the patent disclose a cart with a telescoping handle.

U.S. Pat. No. 4,533,091 issued to Campbell discloses a portable multiple spool wire dispenser. This patent does not appear to disclose an apparatus that possesses wire guides for dispensing wire, a closed cabinet to deter environmental contamination, nor does the patent disclose a cart with a telescoping handle.

U.S. Pat. No. 3,856,230 issued to Zimmer discloses a wire dispensing cart. This patent does not appear to disclose an apparatus that possesses wire guides for dispensing wire, a closed cabinet to deter environmental contamination, does not disclose a cart with a telescoping handle nor is there disclosure of an apparatus capable of being placed in an upright manner for wire or cable distribution.

SUMMARY OF THE INVENTION

In view of the foregoing disadvantages inherent in the prior art, it has been observed that there is need for an apparatus that provides those doing electrical work the ability to quickly and easily store, transport and pull wire and cable in an efficient manner.

The multi-functional electrical work caddy provides a means of transporting, storing and deploying multiple wire or cable spools or reels utilizing a transportable caddy.

The multi-functional electrical work caddy possesses a crate like body to which are attached a set of wheels, a telescoping handle, a slidable platform assembly, and a support stand.

The multi-functional electrical work caddy is comprised of non-conductive materials for operator safety.

The multi-functional electrical work caddy is portable and easily set up for use.

The multifunctional electrical work caddy possesses a support stand which when deployed acts to assist in the deployment of wire from the electrical work caddy.

The multifunctional electrical work caddy can accommodate a plurality of wire or cable spools or reels.

The multifunctional electrical work caddy covers and protects wire or cable spools or reels to protect them from dirt or other contaminants.

The multifunctional electrical work caddy provides for the quick changing of spools or reels utilizing a plurality of steel rods, spacers and locking features.

The multifunctional electrical work caddy possesses easy maneuverability due to its wheel base and telescoping handle.

The multifunctional electrical work caddy can accommodate the transportation of tools and other items required for electrical work thereon a platform assembly.

The multifunctional electrical work caddy possesses spacers between the spools or reels of wire or cable to reduce relative rotation during deployment of the wire or cable.

The multifunctional electrical work caddy possesses a plurality of wire guide holes which direct the wire or cable and prevent tangling with other deployed wire or cable.

The multifunctional electrical work caddy may be placed vertically, horizontally or angularly with respect to the floor.

The prior art appears to disclose apparatuses which can accommodate a plurality of wire spools for electrical work. The prior art does not appear to disclose an apparatus which is easily maneuverable, possesses wire guides, a support stand for wire deployment and can protect the contents from dirt or other contaminants.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 multi-functional electrical wire caddy
11 left side wall
12 right side wall
13 top wall
14 bottom wall
15 floor panel
20 cart
30 rod
31 rod groove
32 rod aperture
33 spool spacer
40 wheel
41 axle
42 axle brackets
45 cart foot pad
50 platform
51 platform guide
52 platform locking pin
53 platform aperture
60 first handle
61 first handle telescoping member
62 first handle guide
63 first handle bracket
64 first handle grip
65 second handle
66 third handle
67 fourth handle
70 support stand
71 stand foot pad
72 stand brace
73 stand bracket
74 stand clip
80 upper wire guide hole
81 lower wire guide hole
82 platform wire guide hole
100 spool
105 wire
110 fastener/attachment

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a multi-functional electrical wire caddy (herein described as the "apparatus") 10, which provides a means for transporting, storing, and deploying multiple wire spools 100 using a transportable crate-like cart device 20 with functional features to facilitate the process of pulling and installing multiple wires 105 at a work site. Attached to the cart 20 are a set of wheels 40, a handle 60, and a support stand 70 allowing the apparatus 10 to be easily moved and set in place at a work site. When in use the support stand 70 holds the apparatus 10 in position during a wire pulling operation. The cart enclosure 20 also provides a shield for the wire spools 100 from work site contaminants. Integral to the design are a series of steel rods 30, spacers 33, and locking features 31 that allow for the quick interchange of wire spools 100.

The apparatus 10 is envisioned to be fabricated of lightweight, durable plastic materials being produced in an injection molding process with metallic components formed or machined from bar and plate stock and rubber for foot pads.

Figure 1:
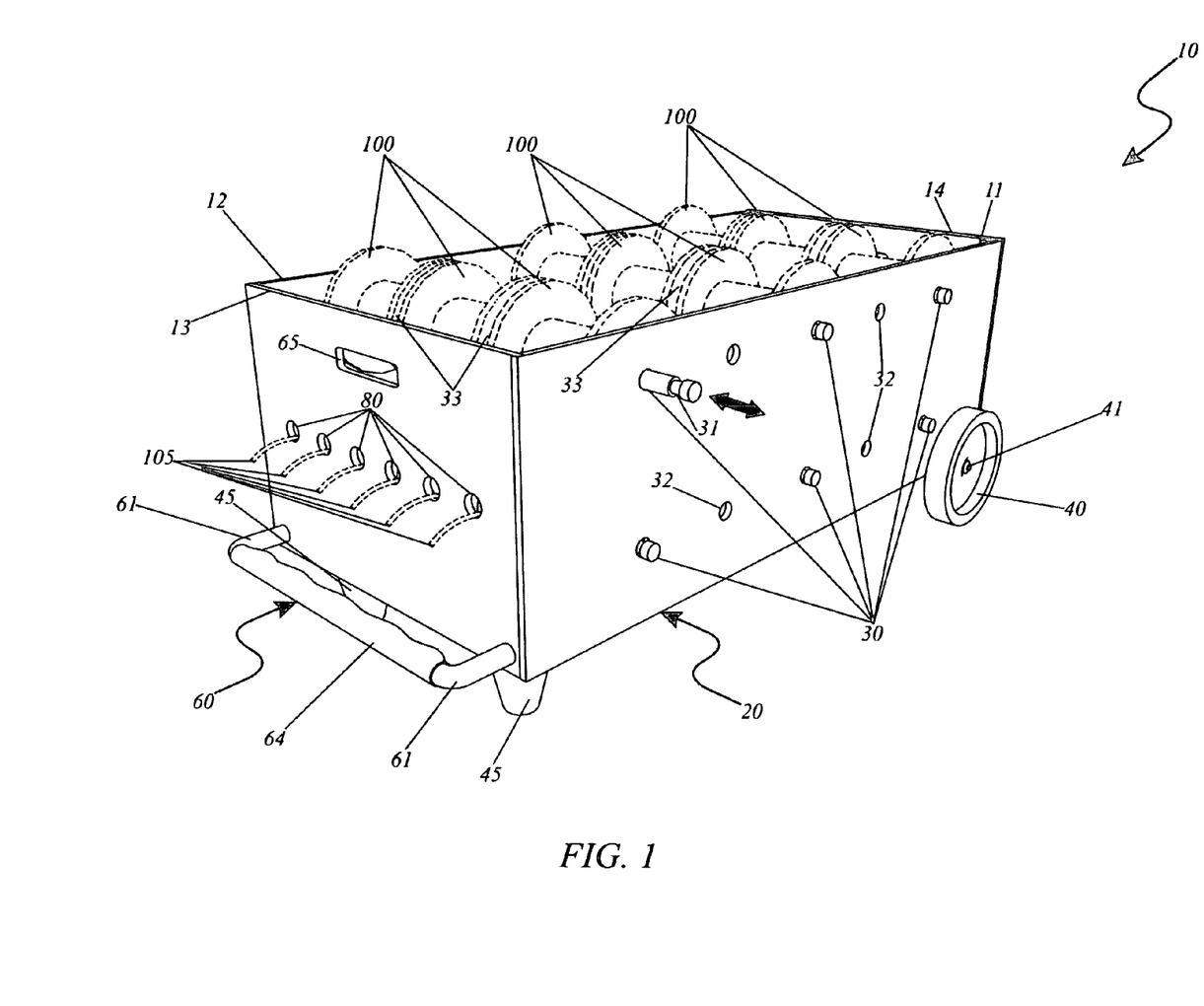
FIG. 1 is a perspective view of a multi-functional electrical work caddy 10, according to a preferred embodiment of the present invention; and, FIG. 2 is a side perspective view of a multi-functional electrical work caddy 10 depicting a deployed first handle 60 and platform 50, according to a preferred embodiment of the present invention; and, FIG. 3a is a front perspective view of a multi-functional electrical work caddy 10 in an as-purchased state, according to a preferred embodiment of the present invention; and, FIG. 3b is a front perspective view of a multi-functional electrical work caddy 10 in an in-use state, according to a preferred embodiment of the present invention; and, FIG. 4 is a bottom perspective view of a multi-functional electrical work caddy 10 depicting a platform portion 50, according to a preferred embodiment of the present invention; and, FIG. 5 is a rear perspective view of a multi-functional electrical work caddy 10 depicting a support stand portion 70, according to a preferred embodiment of the present invention.

Referring now to FIG. 1, a perspective view of the apparatus 10, according to the preferred embodiment of the present invention, is disclosed. The apparatus 10 takes the form of a two-wheeled 40 portable cart 20 having a telescoping handle 60, an extending platform 50, and a support stand 70. Consequently, the apparatus 10 may be utilized in a secure vertical, angular, or horizontal position, with respect to a ground/floor surface.

The cart 20 is envisioned to be an open top box-like structure comprising a top wall 13, a bottom wall 14, a left side wall 11, a right side wall 12, and a floor panel 15. The cart 20 comprises a rectangular shape approximately eighteen (18) to thirty-six (36) inches on a side providing dimensions sufficient to accommodate a plurality of wire spools 100 of various sizes and forms comprising wire 105 having a variety of gauges and insulation colors. The cart 20 further provides an enclosure and shielding means thereto said wire spools 100 and wire 105 from work site contaminants such as, but not limited to, dust, dirt, grime, and other forms of contamination. The sides 11, 12, walls 13, 14 and floor 15 may be introduced as a single injection-molded plastic enclosure or as an assembly of rectangular panels using plastic, fiberglass, metal, wood, or the like being affixed thereto one another using methods such as adhesives, screws, rivets, or the like.

The cart 20 provides an attachment means thereto a pair of common rubber-treaded metal wheels 40 laterally spaced and secured thereto an axle 41 attached thereon a lower surface of the floor 15 via a pair of axle brackets 42, thereby providing relative rotation and movement to the cart 20. The wheels 40 are envisioned to have a large diameter providing ample space therebetween a ground/floor surface and the apparatus 10 thereby providing motion of the apparatus 10 over obstructions and rough surfaces. The floor panel portion 15 of the cart 20 provides an attachment means thereto a telescoping first handle 60, comprising a pair of first handle telescoping members 61 and a first handle grip 64. The telescoping first handle 60 provides a manual transporting means thereto the cart 20 when utilized in conjunction with the wheels 40 to provide relative motion of the apparatus 10 from place-to-place (see FIG. 2).

A stationary second handle 65 is formed integral thereto the top wall 13 for lifting of the apparatus 10 by a user or other lifting mechanisms. The second handle 65 takes the form of an oval or elliptical-shaped aperture therethrough the top wall 13 preferably positioned at an intermediate location close to the outer rim of the top wall 13 such that the apparatus 10, and consequently the spools 100, may be carried or moved in combination with, or instead of, using the first handle 60 and wheels 40. The stationary second handle 65 may be placed so as to align with the center of gravity of the combined weight of the spools 100 and the apparatus 10.

Figure 3A:
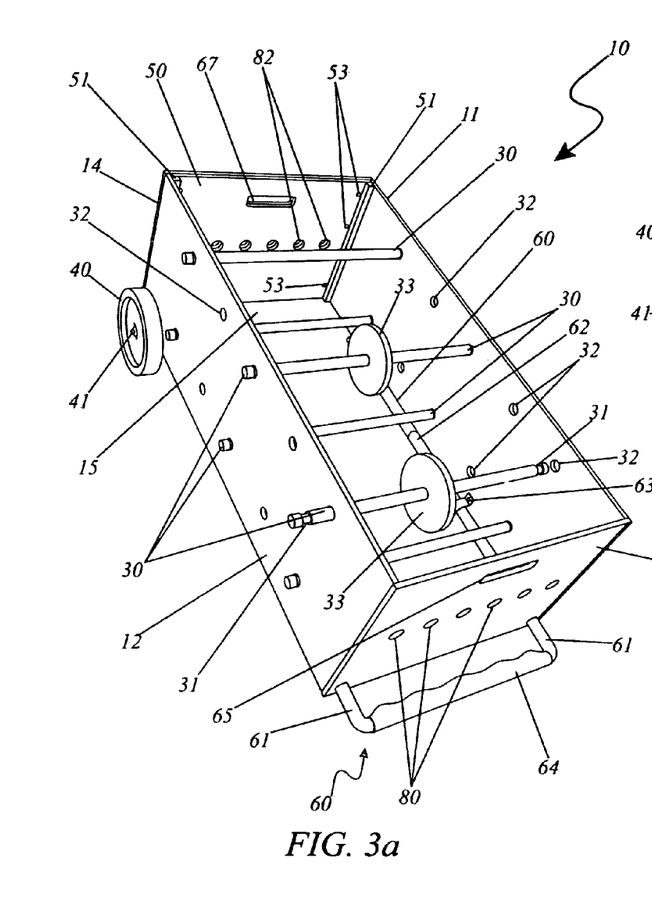
Figure 3B:
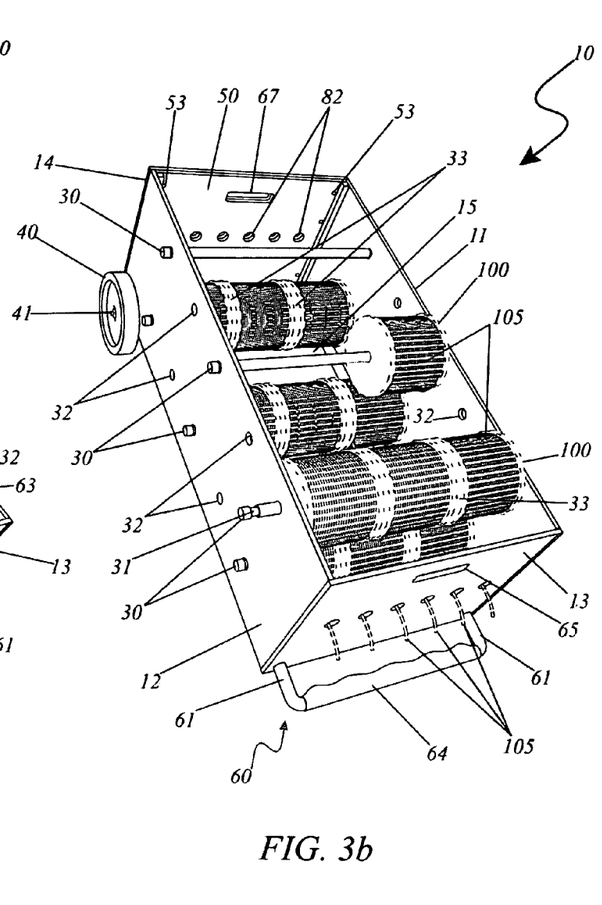

The left 11 and right 12 side walls extend forwardly therefrom the floor panel 15 comprising a plurality of rods 30 and rod apertures 32 which provide an axial mounting means thereto a plurality of wire spools 100 of different diameters and widths (see FIGS. 3a and 3b).

The top wall 13 comprises a plurality of upper wire guide holes 80 drilled therethrough being located above the spools 100 adapted for removably receiving one (1) or more wires 105 therefrom spools 100 removably secured therein the cart 20. One (1) or more upper wire guide holes 80 may be used individually or simultaneously for drawing one (1) or a plurality of wires 105 from the cart 20 without entangling the wires 105, as they are being drawn therefrom. The upper guide holes 80 are formed in a horizontal row and spaced adequately from one another to compel the selected wires 105 to slope upwardly away from the spools 100 and perpendicularly away from the axis of rotation of said spools 100.

The apparatus 10 further comprises a pair of cart foot pads 45 secured relative to the underside of the floor 15 relative to the upper portion of the apparatus 10. The cart foot pads 45 extend perpendicularly downward therefrom a bottom surface of the floor 15 to be utilized to permit the apparatus 10 to stably lie horizontally as opposed to vertically for unwinding of wire 105 from the spools 100 at a remote site. The cart foot pads 45 comprise a particular length such that while in a horizontal position, the floor portion 15 of the apparatus 10 remains parallel thereto a ground/floor surface. The cart foot pads 45 are envisioned to be affixed thereto a bottom surface of the floor 15 using bolts, screws, or the like.

Figure 2:
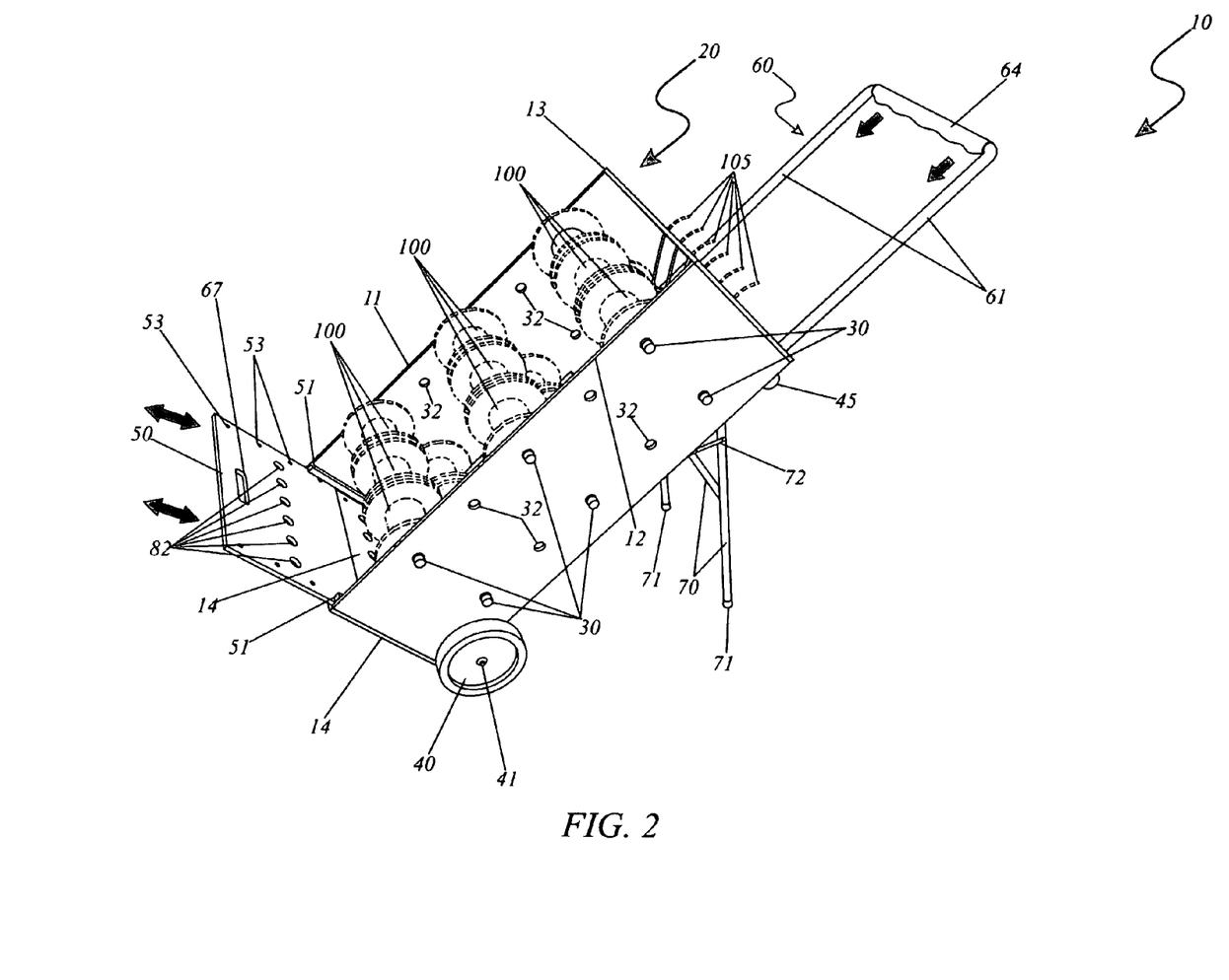

Referring now to FIG. 2, a side perspective view of the apparatus 10 depicting a deployed first handle 60 and platform 50, according to a preferred embodiment of the present invention, is disclosed. The floor panel 15 of the cart 20 provides an attachment means thereto a telescoping first handle 60, comprising a pair of first handle telescoping members 61, a pair of first handle guides 62, a pair of first handle brackets 63, and a first handle grip 64. The telescoping first handle 60 provides a manual transporting means thereto the cart 20 when utilized in conjunction with the wheels 40 to provide relative motion of the apparatus 10 from place-to-place. The telescoping first handle 60 provides a length adjustable device made using metal tubular elements. The telescoping first handles 60 comprise parallel tubular elements affixed thereto the cart 20 being slidingly inserted thereinto the first handle guides 62 in a telescoping manner. The first handle guides 62 comprise a pair of stationary parallel tubular elements mounted thereto internal wall surfaces of the cart 20 affixed thereto, and at internal intersections of the floor panel 15 and side walls 11, 12 via first handle brackets 63. The first handle brackets 63 comprise a common metal right-angle tubing bracket providing a mating profile thereto the first handle guides 62 being fastened thereto said floor panel 15 and side walls 11, 12 using common fasteners 110 such as screws, bolts, rivets, or the like. The first handle 60 also provides an adjustable raising or lowering means with respect to the stationary first handle guides 62. The first handle telescoping members 61 and the first handle guides 62 are envisioned to comprise internal incremental locking devices similar to those used in conventional luggage offering extendable handles, being common in the industry and providing locking thereat a desired position. The first handle telescoping members 61 extend therethrough circular openings in the top wall 13 being joined at extended end portions by the first handle grip 64. The first handle grip 64 provides a manual grasping means thereto the first handle 60 being affixed thereto end portions thereof using common fasteners such as screws, bolts, rivets, or the like and extending perpendicularly therefrom. The first handle grip 64 comprises a generally cylindrical-shaped plastic device being made in a plastic injection molding process. The first handle grip 64 further comprises a textured surface and a plurality of recessed areas conforming thereto a user's fingers in an expected manner.

Referring now to FIGS. 3a and 3b, front perspective views of the apparatus 10 in as-purchased and in-use states, according to a preferred embodiment of the present invention, is disclosed. The left 11 and right 12 side walls extend forwardly therefrom the floor panel 15 comprising a plurality of rod apertures 32 axially aligned adapted for receiving and releasably securing a plurality of rotating rods 30. The rods 30 provide an axial mounting means thereto a plurality of wire spools 100 of different diameters and widths. Said spools 100 may be arranged using a portion or all available rods 30 and rod apertures 32 being arranged in a variety of configurations. The rods 30 comprise radial rod grooves 31 at each end corresponding laterally thereto a contact point therewith the left 11 and right 12 side walls. The rod grooves 31 comprise a reduced diameter along a length thereupon providing a lateral stabilizing means thereto the rods 30 during use. The rod apertures 32 are defined by a slightly larger diameter than the rotatably releasable rods 30 thereby permitting sliding removal and rotating motion thereof. The rod apertures 32 are preferably arrayed longitudinally and laterally of equal space, as depicted in FIG. 1; however, the rod apertures 32 may be arrayed differentially spaced longitudinally and laterally such that the rod apertures 32 on the right side wall 12 are axially aligned therewith the corresponding rod apertures 32 on the left side wall 11. Spools 100 of wire 105 comprising various wire 105 gauges may be releasably secured therein the cart 20 by utilizing the rod apertures 32 and the rods 30. The rods 30 are inserted therethrough the rod apertures 32 of a side wall, left 11 or right 12, then inserted therethrough the center apertures of one (1) or more spools 100, then inserted in therethrough the rod apertures 32 of the opposing side wall 11, 12 and secured into place via the rod grooves 31. Attachment of said rods 30 are depicted here in a preferred embodiment comprising rod grooves 31; however, other mounting means may be introduced being designed so as to provide lateral stability thereto the rods 30 such as, but not limited to; vertical slots therein said side walls 11, 12; washers and cotter pins; threaded flanged fixtures; screws or bolts; and as such should not be interpreted as a limiting factor of the present invention 10.

Additionally, a plurality of spool spacers 33 is provided to reduce relative rotation therebetween adjacent spools 100 during a wire-pulling task. The spool spacers 33 comprise flat circular discs having an outside diameter similar to the spools 100 and a center aperture sized so as to fit slidingly thereupon said rods 30. The spool spacers 33 are envisioned being made using wear-resistant plastic materials providing a low-friction bearing surface therebetween said spools 100.

Figure 4:
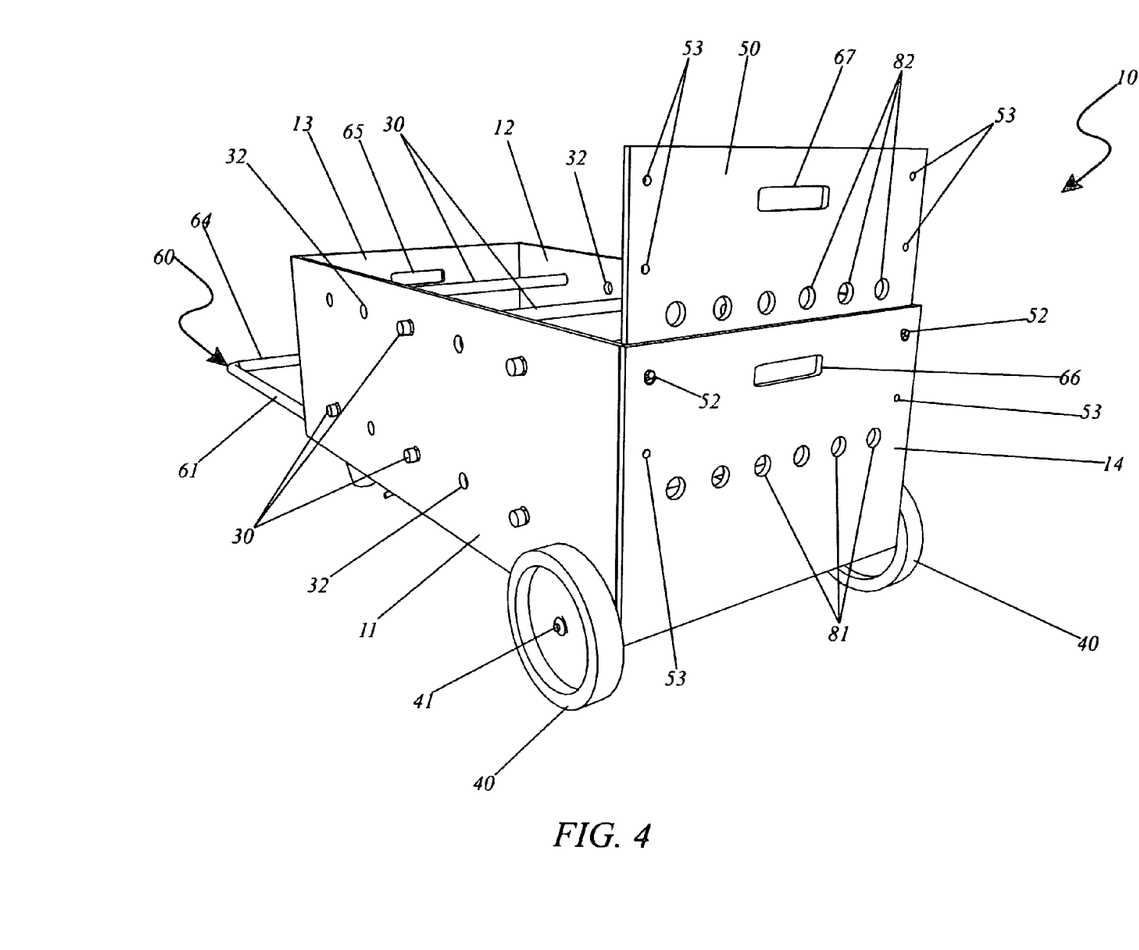

Referring now to FIG. 4, a bottom perspective view of the apparatus 10 depicting a platform portion 50, according to a preferred embodiment of the present invention, is disclosed. The bottom wall 14 provides a sliding attachment thereto an extendable and retractable flat platform 50. The platform 50 provides a wire 105 dispensing means similar to the top wall 13; however, the platform 50 provides an adjustable and lockable height. Additionally, the platform 50 provides a load supporting means for the placement of tools, parts, and/or other desired objects to be transported thereon in a similar fashion as a common 2-wheeled hand dolly. The platform 50 comprises a sliding and locking rectangular surface therewith an inner surface of the bottom wall 14 comprising a pair of platform guide rails 51 and a pair of platform locking pins 52, respectively. Said locking pins 52 are envisioned to be common quick-release pin devices providing ball handles, ring handles, T-handles, or the like. The platform 50 is illustrated here comprising four (4) sets of platform apertures 53 being sized to receive said platform locking pins 52, thereby defining a plurality of specific extended lengths; however, the platform 50 may be introduced with any number of platform aperture pairs 53, thereby providing additional specific lengths thereof. The platform 50 further comprises a plurality of platform wire guide holes 82 and a fourth handle 67 envisioned to be positioned thereto, and function in a similar fashion as the aforementioned upper wire guide holes 80 and second handle 65 portions of the top wall 13. The fourth handle 67 when used in conjunction with the second handle 65 allows carrying or moving of the apparatus 10 in combination with, or instead of, using the first handle 60 and wheels 40. The platform wire guide holes 82 are drilled therethrough the platform 50 so as to correspondingly align therewith the lower wire guide holes 81 positioned on the bottom wall 14 when said platform 15 is in a retracted position, such that the platform 50 is adjacent and aligned therewith the bottom wall 14. The platform 15 is envisioned to be made using similar materials as the floor 15 and side walls 11, 12.

Figure 5:
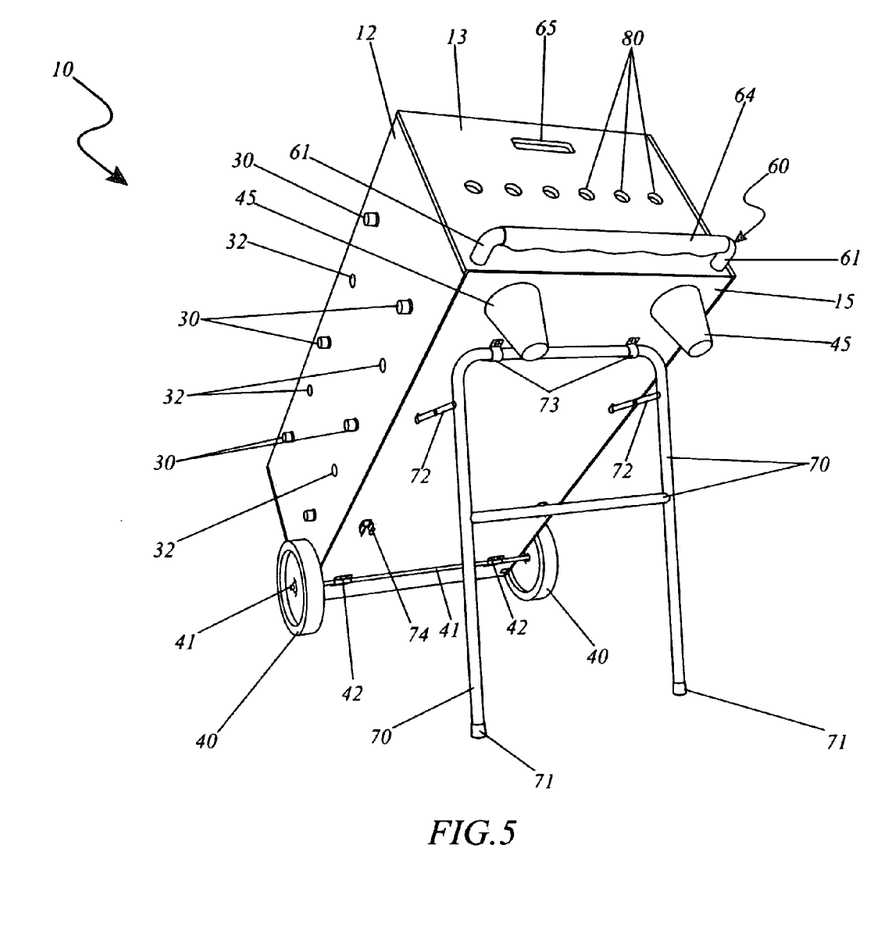

Referring now to FIG. 5, a rear perspective view of the apparatus 10 depicting a support stand portion 70, according to a preferred embodiment of the present invention, is disclosed. The apparatus comprises a deployable and stowable support stand 70 located along a lower surface of the floor panel 15. The support stand 70 provides a means to securely position the apparatus 10 in an angled upright position upon a ground/floor surface. The floor panel 15 provides a rotating hinging attachment means thereto the support stand 70 via a pair of stand brackets 73 being affixed thereto using common fasteners 110. The support stand 70 comprises a sturdy ladder-like assembly or weldment forming a pair of parallel legs extending perpendicularly therefrom said floor panel 15 and having one (1) or more connecting cross-members. The support stand 70 is envisioned to be made using rugged and sturdy elements of plastic, fiberglass, metal, wood, or the like in rectangular or round shapes. The support stand 70 further comprises a pair of stand foot pads 71, a pair of stand braces 72, and a pair of stand clips 74. The stand braces 72 provide folding and locking members, thereby securing the support stand 70 at a work position being perpendicular thereto the floor panel 15 or when folded, securing said support stand 70 in a stowed position being secured against said floor panel 15 in a parallel manner being latched thereto via the stand clips 74. The stand clips 74 provide an open-faced fixture sized suitably to receive said support stand 70 members via a pinching interference fit therein. Said stand clips 74 are affixed thereto the floor panel 15 using common fasteners 110 in an expected manner. The stand foot pads 71 comprise a rubber boot thereupon an end portion of the support stand 70 providing a stable high-friction skid-proof means thereto the support stand 70 when deployed and locked during a wire-pulling task. The stand foot pads 71 are envisioned to be affixed thereto the support stand 70 using fastening methods such as adhesives, screws, rivets, or the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. Likewise, experienced electricians, television installers, telecommunication installers, and do-it-yourselfers may utilize this invention for transporting, storing, and deploying wire 105 stored on spools 100. After initial purchase or acquisition of the apparatus 10, it would be utilized as indicated in FIGS. 1 and 2.

The method of utilizing the apparatus 10 may be achieved by performing the following steps: inserting each rod 30 separately therethrough a desired rod aperture 32 positioned on one (1) of the two (2) side walls 11, 12 thereof; inserting said rod 30 therethrough center apertures of desired spools 100 and spool spacers 33; inserting said rod 30 therethrough the opposing rod aperture 32 on the opposing side wall 11, 12 thereof such that the rod 30 is perpendicular with the top 13 and bottom 14 walls respectively; repeating rod 30 insertion procedures for releasably securing a plurality of spools 100 on a plurality of rods 30; locking the rods 30 into the desired locations within the cart 20 using the rod grooves 31; utilizing the second handle 65 and/or telescopic first handle 60 in conjunction with the wheels 40 to easily move and/or transport the apparatus 10 to a job site or other desired locations; loading and/or transporting various equipment, tools, parts, and the like as needed, by extending and locking the platform 50; positioning the apparatus 10 in the vertical upright orientation, laying the apparatus 10 horizontally, or deploying and utilizing the support stand 70 to angularly situate the apparatus 10 to a desired position; inserting the desired wires 105 therethrough the upper wire guides 80, lower wire guides 81, and/or platform wire guides 82, as required; pulling one (1) or more wires 105 therefrom said spools 100 to complete a task.

A user has the option of placing the apparatus 10 vertically, horizontally, or angularly with respect to a floor/ground surface. One (1) or more spools 100 may be removably secured therewithin the rods 30 respectively. The user also has the option of utilizing wire guide holes 80, 81, 82 positioned on the top walls 13, bottom walls 14, or platform 50. The platform 50 is envisioned to slidably extend outward and lock into place using the platform locking pins 52 thereby providing a user with a structural surface for placement of tools, parts, and the like while moving or transporting the apparatus 10.

The apparatus 10 introduces an improved portable cart 20 equipped with rotatable wheels 40 to be used in conjunction with a telescoping first handle 60 and/or stationary second handle 65 and cart foot pads 45. A plurality of wire guide holes 80, 81, 82 is utilized to guide one (1) or more wires 105 therethrough said guide holes 80, 81, 82 for easy pulling therethrough. Accordingly, multiple spools 100 of wire 105 may be easily transported to a job site in a simple and effortless manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A caddy for organizing, storing and transporting a plurality of electrical wires or cables on spools or reels, comprising:
    a cart, further comprising an open box enclosure with a pair of side walls, a top wall, a bottom wall, and a floor and defining an interior within;
    a pair of wheels attached thereto a bottom rear surface of said floor of said cart with a wheel attachment means;
    a pair of cart foot pads secured thereto a bottom front surface of said floor;
    a first handle attachable thereto an outer surface of said top wall;
    a second handle formed thereof said top wall;
    a third handle formed thereof said bottom wall;
    a plurality of spool mounting means attachable to and spanning a space therebetween said pair of side walls; and,
    a plurality of wire guide holes formed thereof said cart.

2. The caddy of claim 1, wherein said cart comprises a rectangular construction with a width in the range of and including eighteen (18) to thirty-six (36) inches, thereby accommodating a plurality of spools or reels of various sizes and forms.

3. The caddy of claim 2, wherein said enclosure further comprises a single injection-molded plastic construction.

4. The caddy of claim 2, wherein said enclosure further comprises a modular assembly of rectangular panels affixed thereto one another with a fastening means.

5. The caddy of claim 1, wherein said wheel attachment means comprises an axle attached thereon a lower surface of the floor via a pair of axle brackets.

6. The caddy of claim 5, wherein said pair of wheels each comprise a rubber-treaded metal construction.

7. The caddy of claim 1, wherein said first handle further comprises a tubular telescoping handle assembly, comprising:
    a pair of first handle guides each mounted thereto opposing inner surface of said pair of side walls and an inner surface of said floor;
    a pair of first handle telescoping members each slidably engaged therein said pair of first handle guides and having an end portion; and,
    a pair of first handle brackets securing said pair of first handle guides thereto said pair of side walls and said floor therewith fastening elements;
    a first handle grip affixed thereto each end portion of said pair of first handle telescoping members with a first handle grip fastening means; and,
    a first handle adjustable means for selectively raising and lowering said pair of first handle telescoping members with respect to said pair of first handle guides to a desired position;
    wherein said pair of first handle telescoping members extend therethrough said top wall being joined at said end portions by said first handle grip.

8. The caddy of claim 7, wherein said first handle grip further comprises a generally cylindrical-shaped plastic device with a textured surface and a plurality of recessed grooves.

9. The caddy of claim 1, wherein said plurality of spool mounting means further comprises:
    a plurality of rod apertures axially aligned and located on opposing inside surfaces of said pair of side walls;
    a plurality of rods spanning said interior of said cart and comprising a rod length; and,
    a plurality of radial rod grooves located at each end of said plurality of rods and corresponding laterally thereto a contact point therewith said pair of side walls;
    wherein said plurality of rod apertures are arranged and configured at various positions thereof said pair of side walls;
    wherein said plurality of rod apertures are adapted for receiving and releasably securing said plurality of rods and permitting sliding removal and rotating motion thereof;
    wherein said plurality of rods provide an axial mounting means thereto a plurality of spools or reels of different diameters and widths;
    wherein said plurality of rod grooves comprise a lateral stabilizing means thereto said plurality of rods during use.

10. The caddy of claim 9, further comprising a plurality of spool spacers each comprising a flat circular disc for slidably mounting thereon said plurality of rods;
    wherein said plurality of spool spacers are provided to reduce relative rotation therebetween adjacent spools or reels during a pulling task and to provide a space between adjacent spools or reels.

11. The caddy of claim 9, further comprising other rod mounting means to provide lateral stability thereto said plurality of rods with respect to said cart.

12. The caddy of claim 1, wherein said plurality of wire guide holes further comprises:
    a plurality of upper wire guide holes drilled therethrough said top wall in a horizontal row and equidistantly spaced; and,
    a plurality of lower wire guide holes drilled therethrough said bottom wall in a horizontal row and equidistantly spaced;
    wherein said plurality of upper wire guide holes and lower guide holes are each adapted for removably receiving at least one wire or cable therefrom said spools or reels.

13. The caddy of claim 1, further comprising an extendable and retractable platform assembly attached thereto an inner surface of said cart adjacent thereto said bottom wall, further comprising:
    a platform portion further comprising a plurality of platform wire guide holes drilled therethrough said platform portion in a horizontal row and equidistantly spaced and a fourth handle formed thereof;
    a sliding attachment for slidably mounting said platform portion to said cart, further comprising a pair of platform guide rails attached thereto an inner surface of said pair of side walls adjacent thereto said bottom wall; and,
    a platform locking assembly comprising a pair of platform locking pins located thereon said bottom wall and a plurality of platform locking apertures sized to receive said platform locking pins located on an upper outer surface of said platform portion;

wherein said platform portion provides a load supporting means for placement of desired objects to be transported thereon;

wherein when said platform portion is fully retracted within said cart, said platform wire guide holes correspondingly align therewith said lower wire guide holes thereof said bottom wall; and, wherein said plurality of platform locking apertures provides a means for selectively positioning said platform portion relative thereto said cart.

14. The caddy of claim 1, comprising a deployable and stowable support stand attached thereto a lower surface of said floor of said cart and further comprising:

a pair of parallel legs extending perpendicularly therefrom said floor panel and having at least one connecting cross-members;

a pair of tubular stand brackets being affixed thereto said floor with support stand fastening elements and securing said pair of parallel legs thereto said cart;

a pair of stand foot pads located thereon said pair of parallel legs;

a pair of stand braces comprising folding and locking members for securing said parallel legs; and, a pair of stand clips providing a circular open-faced fixture to receive said parallel legs and are affixed thereto said floor;

wherein said support stand provides a means to securely position said cart in an angled upright position upon a ground or floor surface;

wherein said pair of support braces secure said parallel legs in an upright position with respect to said cart; and, wherein said pair of support stand clips secure said parallel legs in a folded position with respect to said cart.

15. The caddy of claim 14, wherein said stand foot pads further comprise a cylindrical rubber boot thereby providing a stable high-friction skid-proof means thereto said support stand when deployed and locked during a pulling task.

16. A caddy for organizing, storing and transporting a plurality of electrical wires or cables on spools or reels, comprising:

a cart, further comprising an open box enclosure with a pair of side walls, a top wall, a bottom wall, and a floor and defining an interior within;

a pair of wheels attached thereto a bottom rear surface of said floor of said cart with a wheel attachment means;

a pair of cart foot pads secured thereto a bottom front surface of said floor;

a tubular telescoping first handle assembly, further comprising:

a pair of first handle guides each mounted thereto opposing inner surface of said pair of side walls and an inner surface of said floor;

a pair of first handle telescoping members each slidably engaged therein said pair of first handle guides and having an end portion; and, a pair of first handle brackets securing said pair of first handle guides thereto said pair of side walls and said floor therewith fastening elements;

a first handle grip affixed thereto each end portion of said pair of first handle telescoping members with a first handle grip fastening means;

a first handle adjustable means for selectively raising and lowering said pair of first handle telescoping members with respect to said pair of first handle guides to a desired position;

a first handle attachable thereto an outer surface of said top wall;

a second handle formed thereof said top wall;

a third handle formed thereof said bottom wall;

a plurality of spool mounting means attachable to and spanning a space therebetween said pair of side walls, further comprising:

a plurality of rod apertures axially aligned and located on opposing inside surfaces of said pair of side walls;

a plurality of rods spanning said interior of said cart and comprising a rod length; and, a plurality of radial rod grooves located at each end of said plurality of rods and corresponding laterally thereto a contact point therewith said pair of side walls;

an extendable and retractable platform assembly attached thereto an inner surface of said cart adjacent thereto said bottom wall, further comprising:

a platform portion further comprising a fourth handle formed thereof;

a sliding attachment for slidably mounting said platform portion to said cart, further comprising a pair of platform guide rails attached thereto an inner surface of said pair of side walls adjacent thereto said bottom wall; and, a platform locking assembly comprising a pair of platform locking pins located thereon said bottom wall and a plurality of platform locking apertures sized to receive said platform locking pins located on an upper outer surface of said platform portion;

a plurality of wire guide holes formed thereof said cart, further comprising:

a plurality of upper wire guide holes drilled therethrough said top wall in a horizontal row and equidistantly spaced;

a plurality of lower wire guide holes drilled therethrough said bottom wall in a horizontal row and equidistantly spaced; and, a plurality of platform wire guide holes drilled therethrough said platform portion in a horizontal row and equidistantly spaced; and, a deployable and stowable support stand attached thereto a lower surface of said floor of said cart and further comprising:

a pair of parallel legs extending perpendicularly therefrom said floor panel and having at least one connecting cross-members;

a pair of tubular stand brackets being affixed thereto said floor with support stand fastening elements and securing said pair of parallel legs thereto said cart;

a pair of stand foot pads located thereon said pair of parallel legs;

a pair of stand braces comprising folding and locking members for securing said parallel legs; and, a pair of stand clips providing a circular open-faced fixture to receive said parallel legs and are affixed thereto said floor.

17. The caddy of claim 16, wherein said cart comprises a rectangular construction with a width in the range of and including eighteen (18) to thirty-six (36) inches, thereby accommodating a plurality of spools or reels of various sizes and forms.

18. The caddy of claim 16, wherein said enclosure further comprises a single injection-molded plastic construction.

19. The caddy of claim 16, wherein said enclosure further comprises a modular assembly of rectangular panels affixed thereto one another with a fastening means.

20. The caddy of claim 16, wherein said wheel attachment means comprises an axle attached thereon a lower surface of the floor via a pair of axle brackets.

21. The caddy of claim 16, wherein said pair of wheels each comprise a rubber-treaded metal construction.

22. The caddy of claim 16, wherein said first handle grip further comprises a generally cylindrical-shaped plastic device with a textured surface and a plurality of recessed grooves.

23. The caddy of claim 16, further comprising a plurality of spool spacers each comprising a flat circular disc for slidably mounting thereon said plurality of rods.

24. The caddy of claim 16, further comprising other rod mounting means to provide lateral stability thereto said plurality of rods with respect to said cart.

25. The caddy of claim 16, wherein said stand foot pads further comprise a cylindrical rubber boot thereby providing a stable high-friction skid-proof means thereto said support stand when deployed and locked during a wire-pulling task.

26. A method of organizing, storing and transporting a plurality of electrical wires or cables on spools or reels utilizing a portable caddy comprises the following steps:

inserting at least one rod separately therethrough a desired rod aperture located thereon a first side wall of said portable caddy;

inserting said rod therethrough a center aperture of at least one desired spool or reel and at least one spool spacer;

inserting said rod therethrough an opposing rod aperture located thereon and axially aligned thereof said second side wall such that said rod is perpendicular with a top wall and a bottom wall of said portable caddy;

inserting a desired number of rods therethrough other rod apertures of said first and second side wall to store and transport a desired amount of contents;

locking said rods into said rod apertures using a pair of rod grooves located thereon ends of said rods;

transporting said portable cart and contents to a desired location utilizing either a first telescoping handle assembly with a first handle grip or a second handle each located thereon said top wall, in conjunction with a pair of wheels, said telescoping handle assembly is selectively adjusted to a desired length;

loading and transporting various equipment as needed by slidably extending and locking a platform assembly to a desired position located adjacent thereto said bottom wall;

positioning said portable caddy in a vertical upright orientation by supporting said portable cart and contents thereon a pair of cart foot pads;

manipulating said portable caddy either by first telescoping handle assembly, said second handle, a third handle located thereof said bottom wall, or a fourth handle located thereof said platform assembly;

deploying a support stand to angularly situate the apparatus to a desired position;

securing said support stand therewith a pair of support braces at said desired position;

inserting at least one electrical wire or cable therethrough at least one upper wire guide located thereof said top wall, at least one lower wire guide located thereof said bottom wall, or at least one platform wire guide located thereof said platform assembly; and, pulling at least one electrical wire or cable therefrom said desired spool or reel to complete a pulling task.

* * * * *